United States Patent [19]

Tomasek et al.

[11] Patent Number: 4,992,881

[45] Date of Patent: Feb. 12, 1991

[54] PROTECTIVE COVER FOR FLIGHT INSTRUMENT FILTER GLASS

[75] Inventors: Robert J. Tomasek; Sharon E. Runyon, both of Phoenix, Ariz.

[73] Assignee: Honeywell Inc., Minneapolis, Minn.

[21] Appl. No.: 339,329

[22] Filed: Apr. 14, 1989

[51] Int. Cl.⁵ .............................................. H04N 5/65
[52] U.S. Cl. .................. 358/245; 358/252; 358/255; 358/247
[58] Field of Search ............... 358/245, 247, 248, 249, 358/250, 252, 253, 254, 255; 220/2.1 A; 174/35 MS, 35 GC, 35 R

[56] References Cited

U.S. PATENT DOCUMENTS

| | | | |
|---|---|---|---|
| 4,381,421 | 4/1983 | Coats et al. | 358/245 |
| 4,514,585 | 4/1985 | Paynton | 358/245 |
| 4,599,535 | 7/1986 | Toch | 358/253 |
| 4,686,576 | 8/1987 | Dickie et al. | 358/245 |
| 4,709,272 | 11/1987 | Tischer | 358/247 |

*Primary Examiner*—Edward L. Coles, Sr.
*Assistant Examiner*—Jerome Grant
*Attorney, Agent, or Firm*—Dale E. Jepsen; R. Jensen; A. Medved

[57] ABSTRACT

A protective cover for a flight instrument filter glass mounted in a cockpit instrument panel having a display screen mounted in the display unit. The display unit includes a chassis and a frame-like bezel mounted on the chassis in front of the filter glass. The bezel masks the peripheral interface between the filter glass and the display unit opening. The bezel includes a front surface adjacent to the front of the filter glass and a rear edge spaced from the front surface and adjacent to the instrument panel. The protective cover comprises a faceplate portion having a sidewall and a lip spaced from the faceplate and extending from the sidewall in a direction parallel to the plane of the faceplate. The space between the lip and faceplate being approximately equal to the space between the front surface of the bezel and rear edge of the bezel for retaining the faceplate in spaced relationship from the filter glass.

10 Claims, 1 Drawing Sheet

PROTECTIVE COVER FOR FLIGHT INSTRUMENT FILTER GLASS

BACKGROUND AND SUMMARY

This invention relates to aircraft flight instrument display units having a filter glass positioned in front of the display screen and more particularly to a protective cover for the filter glass.

In modern aircraft, more and more of the flight instrument systems rely on relatively large video-type cathode ray tube (CRT) instrumentation display screens as compared to electromechanical flight instrument displays. A filter glass having optical-quality coatings applied thereon is positioned in front of the display. The coatings are applied primarily to reduce the intensity of reflections inherent in the aircraft cockpit environment without reducing the light transmission from the display. The optical-quality coating can, for example, be the type specified by the Aerospace Material Specification Number AMS2521A. The specification is available from the Society of Automotive Engineers, 400 Commonwealth Drive, Warrendale, PA.

The coating, along with the filter glass, is susceptible to scratching, chipping, or cracking, due to inadvertent bumping or abrasion during processing of the display unit on the production line, in testing or during various servicing procedures in the aircraft cockpit. Excessive damage due to bumping or abrasion requires the replacement of the filter glass and sometimes the entire display unit, at great cost in both time and materials.

Presently, to avoid scratching and chipping during production, testing, and servicing, a protective self-adhesive tape is applied to the filter glass. However, the protective tape does not prevent inadvertent cracking of the filter glass itself.

While the use of the protective tape is effective in preventing scratching and chipping, eventually, the tape must be removed and the filter glass must be carefully cleaned of adhesive without damaging the optical-quality coating. During the course of a production cycle, various tests are performed on the display unit prior to final acceptance which requires that the protective tape be installed and removed several times, thereby increasing the chances of a mishap. The cleaning process is tedious and labor intensive and may take approximately thirty minutes, and; even with careful cleaning, there are times when the filter glass coating is damaged in the process.

Another problem associated with the use of the protective tape is the generation of static electricity, especially during removal of the tape. As is well known, static electricity can be damaging to the electronic components used in CRT display units which can require the replacement of the entire display unit for servicing.

In order to overcome the foregoing problems, the present invention provides a protective cover for a flight instrument filter glass. The protective cover is rigid, easily installed and removed, and prevents scratching, chipping, or cracking of the filter glass during production, testing, or servicing of the flight instrument display unit.

One embodiment of the invention contemplates a protective cover for a filter glass for a flight instrument display unit mounted in a cockpit instrument panel having a display screen mounted in an opening of the display unit. The display unit includes a chassis and a frame-like bezel mounted on the chassis in front of the filter glass. The bezel masks the peripheral interface between the filter glass and the display unit opening. The bezel includes a front surface adjacent to the front of the filter glass and a rear edge spaced from the front surface adjacent to the instrument panel. The protective cover comprises a faceplate portion having a sidewall and a lip spaced from the faceplate and extending from the sidewall in a direction parallel to the plane of the faceplate. The space between the lip and faceplate being approximately equal to the space between the front surface of the bezel and rear edge of the bezel for retaining the faceplate in spaced relationship from the front of the filter glass.

Further advantages and details of the invention can be had from the following description and claims taken together with the accompanying drawing.

DETAILED DESCRIPTION

Figure 1:
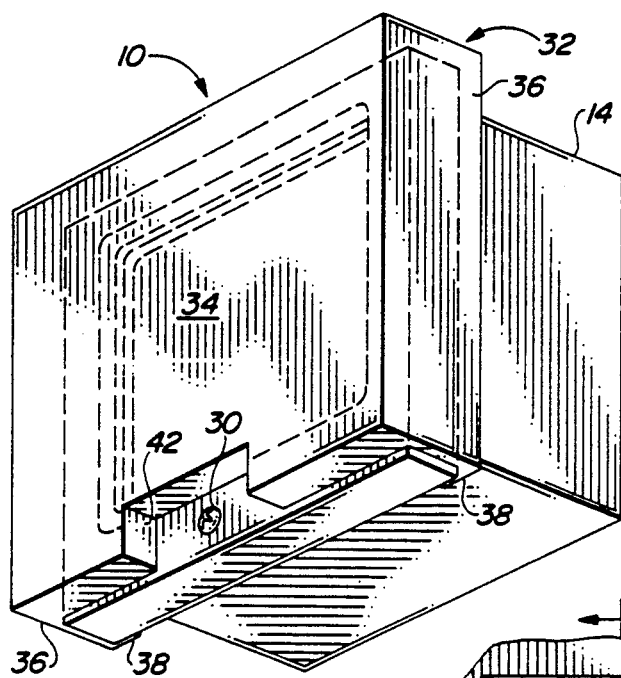
FIG. 1 is a perspective view of a flight instrument display unit with a protective cover installed.
Figure 3:
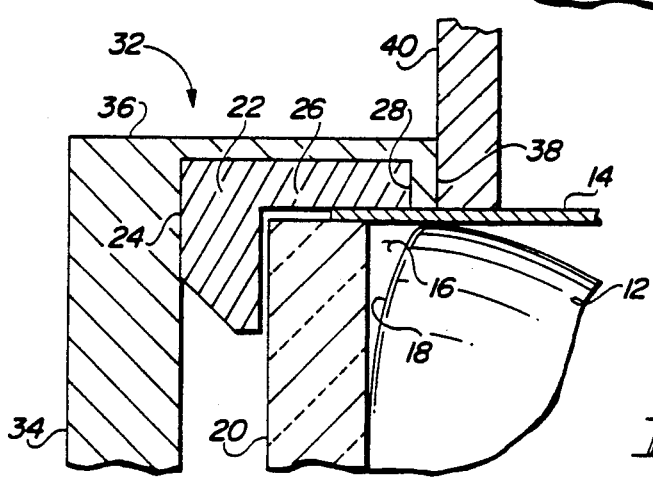
FIG. 3 is a partial cross-section of one corner of the installed flight instrument display unit taken along line III—III of FIG. 2.

Referring now to the drawing, a display unit 10 having a video type display cathode ray tube 12, hereinafter referred to as CRT, such as that used as flight instrumentation in a modern aircraft is shown in FIGS. 1 and 3.

As best shown in FIG. 3, display unit 10 includes a chassis 14 having a filter glass 20 bonded with a clear adhesive 16 to the front of the CRT display screen 18. Display unit 10 further includes a bezel 22 masking the peripheral interface between filter glass 20 and clear adhesive 16 of display unit 10. Bezel 22 includes a front surface 24 and flange 26 extending rearwardly from bezel front surface 24 overlapping chassis 14 and terminating at a rear edge 28. A screen adjustment control 30, FIG. 1 and 2, for display unit 10 extends through the portion of bezel 22 below display screen 18.

Figure 2:
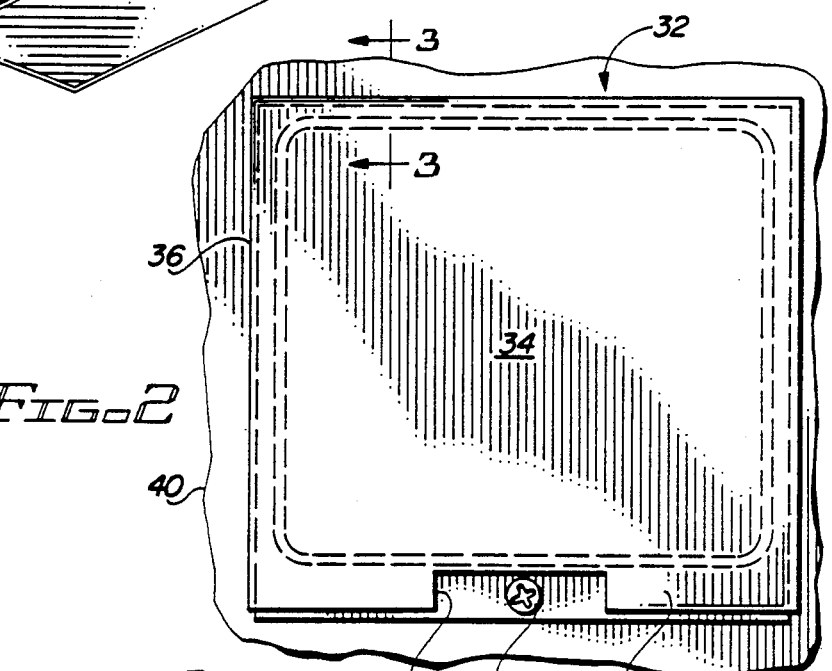
FIG. 2 is a front elevation view of a flight instrument display unit mounted in an aircraft cockpit instrument panel with a fully installed protective cover.

Filter glass 20, FIG. 2, has a generally rectangular shape with an area sufficient to coincide with the viewing area of display screen 18. An optical quality reflection reducing and enhanced light transmitting coating, conforming to specification AMS2521A, as previously mentioned, is applied to the front surface of filter glass 20. Filter glass 20, FIG. 3, is mounted on display unit 10 behind bezel 22 and in front of display screen 18. Display unit 10 is adapted for installation in an aircraft cockpit instrument panel 40.

A protective cover 32 is adapted to slide over bezel 22 in spaced relationship to filter glass 20 forming a rigid shield for preventing inadvertent scratches, chips or cracks to the coating on filter glass 20 or the filter glass itself.

Protective cover 32 includes a faceplate 34 which is preferably made of an optically clear, transparent thermoplastic material having a thickness of one quarter of an inch (0.250 inches). Preferably the thermoplastic material is formulated for high impact strength. A suitable thermoplastic is Cellulose Acetate and is available from Commercial Plastics & Supply; Bensalem, Pennsylvania.

The use of an optically clear faceplate 34, herein described, in addition to protecting against scratching, chipping, or cracking of the filter glass 20, facilitates visual observation of adjustments to display screen 18 during the production cycle, testing and cockpit servicing. However, an opaque faceplate may also be used without departing from the spirit and scope of the present invention.

Protective cover 32 further includes siderails or sidewalls 36 formed along three sides of faceplate 34 and a lip 38 extending from sidewall 36 in a direction parallel to the plane of faceplate 34. Lip 38 is spaced from faceplate 34 by sidewall 36 and in the preferred embodiment is formed coextensive with sidewall 36. Lip 38 functions to retain faceplate 34 in spaced relationship to filter glass 20 when installed on display unit 10. The spacing between faceplate 34 and lip 38 is approximately equal to the distance between front surface 24 and rear edge 28 of bezel 22. Protective cover 32 may include a cutout 42 in faceplate 34, FIGS. 1 and 2, to accommodate access to external controls 30 for display screen 18.

The thickness of sidewall 36 is chosen such that if two display units 10 are mounted side by side, not shown, in the aircraft cockpit instrument panel 40, the thickness of sidewall 36 is slightly less than one half the distance between the bezels 22 of the side by side display units 10, thereby allowing a protective cover 32 to be slid over each of the bezels 22 on the display units 10.

In using the protective cover 32 in the aircraft cockpit environment, display unit 10 is unlocked and moved away from the instrument panel 40 sufficiently to allow protective cover 32 to be slid over and hooked behind the rear edge 28 of bezel 22. With protective cover 32 in place display unit 10 is moved toward instrument panel 40 until lip 38 contacts the surface of panel 40. In this condition, servicing of the display unit 10 itself or other units in the cockpit may proceed, without exposing the surface of filter glass 20 to scratches, chips or cracking. Once servicing in the cockpit is completed, protective cover 32 is removed and display unit 10 is locked in place for normal operation.

Although only one embodiment has been described herein, it is now evident that various alternatives may be available to accomplish the same purposes such as forming the protective cover from discrete parts, such as separate faceplate, sidewalls, and sidewall lips fastened together by various fasteners such as screws or bonding.

As will now be understood, the present invention has many advantages in use. One is that the protective cover does not require any special equipment or cleaners to install or remove from the display unit. Another advantage is that due to its rigidity and spacing from the filter glass, it acts as a buffer from accidental contact or impact of the filter glass surface and coating thereby eliminates chances for scratching, chipping, cracking, or otherwise degrading the filter glass function. A still further advantage is, that by making the faceplate of the protective cover of an optically transparent material, a full view of the display screen is obtained for purposes of adjustment of the display thereon while providing protection to the filter glass during the adjustment process. A further advantage is that the protective cover is an ideal tool for use in production, and cockpit areas because of the ease of installing and removing the protective cover.

It will be apparent to those skilled in the art that many changes may be made to the invention described without departing from the spirit and the scope of the invention and the appended claims.

What is claimed is:

1. A protective cover for a flight instrument display unit having a filter glass mounted behind a bezel framing the filter glass, said bezel having a front surface and a rear edge spaced a first distance from said front surface, said protective cover comprising:
   a. a faceplate,
   b. means attached to said faceplate adapted for removably supporting said faceplate in front of said filter glass, and
   c. means mounted on said supporting means adapted for retaining said faceplate in spaced relationship to said filter glass, wherein said supporting means include a sidewall formed along the sides of said faceplate and wherein said retaining means include a lip mounted on said sidewall and spaced from said faceplate by said sidewall.

2. The protective cover of claim 1 wherein said lip extends from said sidewall in a direction parallel to the plane of said faceplate.

3. The protective cover of claim 2 wherein said lip is formed coextensive with said sidewall and said sidewall is formed along three sides of said faceplate.

4. The protective cover of claim 3 wherein said spacing between said faceplate and said lip is approximately equal to said first distance.

5. The protective cover of claim 4 wherein said faceplate is optically clear.

6. A protective cover for a filter glass for a flight instrument display unit having a display screen mounted in an opening of the display unit, said display unit including a chassis, a frame-like bezel mounted on said chassis in front of said filter glass, said bezel having a front surface and a rear edge spaced from said front surface, said protective cover comprising:
   a. a faceplate,
   b. a siderail mounted on said faceplate,
   c. a lip spaced from said faceplate by said siderail, and
   d. said spacing between said faceplate and said lip being approximately equal to the space between said front surface and said rear edge.

7. The protective cover of claim 6 wherein said siderail is formed along three sides of said faceplate and said lip is mounted on at least two of said siderails and extends from said siderail in a direction parallel to the plane of said faceplate.

8. The protective cover of claim 7 wherein said lip is formed coextensive with said siderails.

9. The protective cover of claim 8 wherein said faceplate is formed of an optically clear thermoplastic material.

10. The protective cover of claim 9 wherein said thermoplastic material has a thickness of approximately one-quarter of an inch and is formulated for high impact strength.

* * * * *